United States Patent [19]
Ledon et al.

[11] Patent Number: 5,928,621
[45] Date of Patent: Jul. 27, 1999

[54] PROCESS FOR THE PREPARATION OF AN ULTRA PURE SOLUTION OF HYDROGEN PEROXIDE BY ION EXCHANGE WITH RECYCLING

[75] Inventors: Henry Ledon; Christine Devos, both of Versailles; Didier Demay, Saint-Remy, all of France

[73] Assignee: L'Air Liquide, Societe Anonyme Pour L'Etude et L'Exploitation des Procedes Georges Claude, Paris, France

[21] Appl. No.: 08/867,960

[22] Filed: Jun. 3, 1997

[30] Foreign Application Priority Data

May 27, 1997 [FR] France .................................. 97 06471

[51] Int. Cl.⁶ .................................................. C01B 15/01
[52] U.S. Cl. .............................................................. 423/584
[58] Field of Search ............................................... 423/584

[56] References Cited

U.S. PATENT DOCUMENTS

| | | |
|---|---|---|
| 3,074,782 | 1/1963 | Meeker et al. . |
| 4,999,179 | 3/1991 | Sugihara et al. ........................ 423/584 |
| 5,397,475 | 3/1995 | Millar et al. . |
| 5,733,521 | 3/1998 | Minamikawa et al. .................. 423/584 |

FOREIGN PATENT DOCUMENTS

| | | |
|---|---|---|
| 774 442 | 10/1996 | European Pat. Off. . |
| 2 056 314 | 8/1980 | United Kingdom . |
| WO96/39237 | 12/1996 | WIPO . |

*Primary Examiner*—Wayne Langel
*Attorney, Agent, or Firm*—Burns, Doane, Swecker & Mathis, L.L.P.

[57] ABSTRACT

Provided is a process for the preparation of an ultrapure hydrogen peroxide solution. The process comprises at least one sequence which includes passing a solution to be purified successively through at least one bed of anion-exchange adsorbents (AEA) and at least one bed of cation-exchange adsorbents (CEA). A non-zero proportion of the solution exiting from one of the beds is recycled to a point upstream of the one bed or upstream of a preceding bed or upstream of the first bed of the first of the at least one sequence. Also provided is a plant for the implementation of the inventive process.

8 Claims, No Drawings

PROCESS FOR THE PREPARATION OF AN ULTRA PURE SOLUTION OF HYDROGEN PEROXIDE BY ION EXCHANGE WITH RECYCLING

BACKGROUND OF THE INVENTION

1. Field of the Invention

The invention relates to a process for the preparation of an ultra pure hydrogen peroxide solution, and to a plant for the implementation of the process.

2. Description of the Related Art

The use of hydrogen peroxide for advanced technology applications or applications in the food industry, in hygiene or health requires increasingly pure products which must meet a growing number of increasingly tight specifications. In particular, the demands of users are turning towards hydrogen peroxide solutions in which the content of each metal impurity is less than one part per billion (ppb) and preferably less than 100 parts per trillion (ppt). In the following account, such solutions will be known as ultrapure hydrogen peroxide solutions.

It is well known, according to the prior art, that it is possible to remove certain impurities by passing the solution through a bed of ion-exchange adsorbents. Mention may be made, for example, of functionalized polymers of polystyrene/divinylbenzene type, silicas or aluminosilicates, in particular the varieties containing controlled micropores, such as zeolites, or active charcoals; these solids carry functional groups capable of complexing either cations or anions. Mention may be made, as examples of functional groups capable of complexing cations, of the carboxylic, sulphonic, phosphonic, hydroxide, amine oxide or phosphine oxide groups or alternatively of cyclic or open polyoxaalkyls, such as, for example, ethylene oxide polymers. Mention may be made, as examples of functional groups capable of complexing anions, of the quaternary ammonium or quaternary phosphonium groups. These adsorbents can also be obtained by polymerization of a monomer carrying a functional group, for example poly(methacrylic acid)s, poly(vinylphosphonic acid)s, polyvinylpyridines, polyvinylpyrrolidones, poly(vinyl alcohol)s, saponified polylactones and copolymers containing these units. The adsorbents which are the most often described are polystyrene gels or crosslinked polystyrenes possessing sulphonic —$SO_3H$ or trimethylammonium $(CH_3)_3N^+$ functional groups.

Many combinations have been provided, such as, for example, anionic resin followed by cationic resin or cationic resin followed by anionic resin or alternatively anionic resin followed cationic resin followed by cationic+anionic "mixed bed". Additions to the inter-stage phases are also described, such as, for example, the addition of acid in order to modify the pH or the addition of chelating agents, such as aminomethylenecarboxylic or aminomethylenephosphonic derivatives.

It is well known to the person skilled in the art that the use of anion-exchange adsorbents presents great difficulties when employed for the purification of hydrogen peroxide. In particular, the hydroxide form, under which these products are generally available industrially, cannot be used directly because of its excessively high basicity, resulting in significant decomposition of hydrogen peroxide. Many publications describe the use of adsorbents exchanged by carbonate or bicarbonate ions, which are less basic, in order to limit the decomposition of hydrogen peroxide, without, however, eliminating it completely.

It is essential to be able to control this phenomenon of decomposition of hydrogen peroxide on adsorbent beds because, as this decomposition with release of gaseous oxygen is exothermic, the rate is accelerated according to the law of Arhenius. The formation of a gas pocket can further aggravate the phenomenon since, by separating the liquid from the decomposition point, the heat released can no longer be removed by evaporation of the water and the cooling effect of the liquid is lost. Such a process is characteristic of a divergent reaction which can result in an extremely violent autoaccelerated decomposition reaction, which is all the more dangerous since it is highly exothermic and produces gaseous oxygen, thus with a considerable expansion force which can cause explosions.

It has been shown that the phenomenon of initiation of the violent decomposition reaction by simple heating of a bed of anion-exchange resin in the trimethylammonium bicarbonate form (Dowex A 550 UPE) in the presence of a 30% aqueous hydrogen peroxide solution at moderate temperature, for example 30 to 350° C., for a few tens of minutes is much faster with a resin which has been used for the purification of the peroxide than with a freshly exchanged resin. If the "TMR" (time to maximum rate), which indicates, at a given temperature, the induction period before initiation of the explosive decomposition, is taken as evaluation parameter, the following results were obtained:

fresh resin:

T=56° C.: TMR=15 min; T=51° C.: TMR=30 min; T=44° C.: TMR=60 min used resin:

T=41° C.: TMR=15 min; T=35° C.: TMR=30 min; T=32° C.: TMR=60 min

It is thus obvious that a used resin is much more sensitive to hydrogen peroxide autodecomposition phenomena, probably because of the catalytic effect of the metal species exchanged during purification.

SUMMARY OF THE INVENTION

The object of the present invention is thus to obtain ultrapure hydrogen peroxide solutions while limiting the risk of violent decomposition of the hydrogen peroxide during the purification stages.

The subject of the present invention is a process for the preparation of an ultrapure hydrogen peroxide solution, characterized in that it comprises at least one sequence which includes passing the solution to be purified through successively at least one bed of anion-exchange adsorbents (AEA) and at least one bed of cation-exchange adsorbents (CEA) and characterized in that a non-zero proportion of the solution exiting from a bed is recycled either upstream of this bed or upstream of one of the preceding beds or upstream of the first bed of the first passing sequence.

DETAILED DESCRIPTION OF THE PREFERRED EMBODIMENTS OF THE INVENTION

The hydrogen peroxide solution to be purified according to the present invention, originating from a technical aqueous solution, has a concentration of 1 to 70% by weight and preferably of 5 to 50% by weight. The adsorbents are chosen from those which are described above.

Generally, the degree of recycling for each of the beds of adsorbents is adjusted so that the mean residence time of the hydrogen peroxide solution to be purified in each bed is at least one minute; a particular subject of the invention is a process as defined above in which the proportion of recycled solution for each bed of adsorbents is greater than 10% by weight and preferably greater than 50% by weight.

The beds of adsorbents exhibit a height to diameter ratio of between 0.5 and 100, in particular between 1 and 5.

The anion-exchange adsorbents will preferably be fed in an upward mode, whereas the cation-exchange adsorbents will preferably be fed in a downward mode. It is possible to define the geometries of the beds so that the true space velocities and/or throughputs in each adsorbent are optimized.

It is also possible to operate under pressure; a working pressure of less than 5 atm above atmospheric pressure will preferably be chosen.

The temperature of the solution to be purified according to the process as described above is less than or equal to 30° C. and preferably between −10° C. and +10° C.

The hydrogen peroxide solution throughputs, expressed as volume of solution/hour passed per volume of bed of adsorbent, can vary between 0.5 and 100, preferably from 1 to 50 and more particularly from 10 to 30. In a specific embodiment of the present invention, the process comprises an AEA→CEA sequence and the hydrogen peroxide solution obtained at the outlet of the (CEA) column is recycled upstream of the (AEA) column.

In an alternative form of the process as defined above, it comprises, upstream or downstream of sequences for passing the solution to be purified through the beds of ion-exchange adsorbents, one or more purification stages, such as, for example, distillation, liquid extraction, crystallization, absorption, filtration, ultrafiltration, nanofiltration or reverse osmosis. If appropriate, the starting solution is brought beforehand to the desired assay and then purified. Depending on the degree of purity and of dilution of the hydrogen peroxide solution to be purified, one or more of these additional stages is/are employed.

In a first preferred alternative form of the present invention, the technical hydrogen peroxide solution to be purified, which is at a concentration of 30% to 70% by weight, is distilled and brought to the desired assay beforehand and then purified through at least two beds of ion-exchange adsorbents, according to the sequence which is the subject of the present invention.

According to a second alternative form of the purification process which is the subject of the present invention, a hydrogen peroxide solution of technical quality or of so-called "food" quality, having a concentration of approximately 50 to 70% by weight, is subjected to the following pretreatment: a first distillation/concentration stage, in order to obtain a condensate having a concentration of greater than 80%, plus a first purification by low-temperature crystallization and the removal of the supernatant. The crystals collected are washed, superficially dried and then melted and the solution obtained is diluted to 30 or 35% with deionized water of ultrapure electronic quality.

It is thus possible very easily to obtain, from an ordinary technical quality hydrogen peroxide solution, a hydrogen peroxide solution of "electronic" quality containing less than 200 ppt of each of the metal cations from groups IA to VIIA and from groups IB to VIII of the table of the Periodic Classification of the Elements.

Another subject of the invention is a plant for the implementation of the process as defined above.

In a preferred alternative form of the present plant, the beds of anion-exchange adsorbents are fed in upward mode and the beds of cation-exchange adsorbents are fed in downward mode.

In another preferred alternative form of the plant, the latter is situated on the customer's site, such as, for example, a site for the manufacture of electronic components, and connected directly to the point of use of the hydrogen peroxide by the customer.

The following example illustrates the invention without, however, limiting it.

EXAMPLE

A purification unit contains two columns filled respectively with 3 liters of an anion-exchange resin Dowex Monosphere A 550 UPE, which has been exchanged beforehand with a sodium bicarbonate solution and washed with water, and 3 liters of a cation-exchange resin Dowex Monosphere C 650 UPN. The diameter of the columns is approximately 11.7 centimeters, which gives a bed height of 28 centimeters, i.e. a ratio: height/diameter of 2.6. 900 liters of a 30% by weight aqueous hydrogen peroxide solution (solution A), obtained by diluting a 60% by weight commercial solution with ultrapure water, are introduced with a throughput of 130 liters per hour, in upward mode, into the first column containing an (AEA) bed and then, in downward mode, into the second column charged with a (CEA) bed. Approximately 600 liters of the purified solution obtained at the outlet of the (CEA) column (solution B) are again passed through the same beds according to the sequence (AEA)→(CEA), the overall time for passing the solution to be treated through beds thus being 1.2 minutes. The solution C is then obtained. Analysis of these three solutions for the purpose of determining the concentrations, expressed in ppt, of the main contaminants leads to the following results:

|    | Solution A | Solution B | Solution C |
| --- | --- | --- | --- |
| Na | 300,000 | 100 | 85 |
| Al | 59,000 | 5200 | 420 |
| Ca | 8000 | 460 | 80 |
| Fe | 2600 | 370 | 170 |
| Sn | 101,000 | 1760 | 140 |

These results show the advantages inherent in the process as defined above. It makes it possible in particular to limit falls in pressure in the columns and thus to operate with high space velocities, facilitating in consequence turbulent exchange and limiting the thickness of the diffusion layer around the grains of adsorbents. This has the beneficial consequence that it is possible to use beds of adsorbents with a low bed height; in the case of an (AEA) bed, this reduces the risk of degassing of the oxygen formed by decomposition, resulting in increased safety.

What is claimed is:

1. A process for the preparation of an ultrapure hydrogen peroxide solution, comprising at least one sequence which includes passing a hydrogen peroxide solution to be purified successively through at least one bed of anion-exchange adsorbents and at least one bed of cation-exchange adsorbents at a throughput of between 0.5 and 100 bed volumes per hour, wherein a non-zero proportion of the solution exiting from one of said beds is recycled to a point upstream of said one bed or upstream of a preceding bed or upstream of the first bed of the first of said at least one sequence.

2. The process according to claim 1, wherein the proportion of recycled solution for each bed of adsorbents is greater than 10% by weight.

3. The process according to claim 2, wherein the proportion of recycled solution for each bed of adsorbents is greater than 50% by weight.

4. The process according to claim 1, wherein said at least one sequence comprises passing said hydrogen peroxide solution to be purified successively through a bed of anion-exchange adsorbents and a bed of cation-exchange adsorbents, and recycling the hydrogen peroxide solution obtained at the outlet of said bed of cation-exchange adsorbents upstream of said bed of anion-exchange adsorbents.

5. The process according to claim 3, further comprising, upstream and/or downstream of the at least one sequence, one or more purification stages, and optionally, a prior operation in which said hydrogen peroxide solution to be purified is brought to a desired concentration.

6. The process according to claim 5, wherein the one or more purification stages are selected from the group consisting of distillation, liquid extraction, crystallization, absorption, filtration, ultrafiltration, nanofiltration and reverse osmosis.

7. The process according to claim 5, wherein the hydrogen peroxide solution to be purified is a technical hydrogen peroxide solution at a concentration of 30% to 70% by weight, said solution being distilled and brought to a desired concentration in a prior operation.

8. The process according to claim 5, wherein the hydrogen peroxide solution to be purified is a technical quality or food quality hydrogen peroxide solution at a concentration of approximately 50 to 70% by weight, said solution being subjected to a pretreatment as follows:

a distillation/concentration stage to obtain a condensate having a concentration of greater than 80%;

purification of the condensate by low-temperature crystallization and removal of a supernatant;

collecting, washing, superficially drying and melting the obtained crystals; and diluting the melted crystals to 30 to 35% with deionized water of ultrapure electronic quality.

* * * * *